United States Patent
Hasegawa et al.

(10) Patent No.: US 6,841,908 B2
(45) Date of Patent: Jan. 11, 2005

(54) STATOR CORE FOR A MAGNETIC BEARING AND THE METHOD OF MANUFACTURING IT

(75) Inventors: Kazumitsu Hasegawa, Narashino (JP); Shinichi Ozaki, Kunitachi (JP); Toshio Takahashi, Koutou-ku (JP); Gen Kuwata, Ichikawa (JP); Noriyasu Sugitani, Chiba (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 0 days.

(21) Appl. No.: 10/112,732

(22) Filed: Apr. 2, 2002

(65) Prior Publication Data

US 2003/0001446 A1 Jan. 2, 2003

(30) Foreign Application Priority Data

Jul. 2, 2001 (JP) ........................................ 2001-201030

(51) Int. Cl.[7] .............................................. H02K 7/09
(52) U.S. Cl. ........................ 310/90.5; 310/43; 310/216; 310/218
(58) Field of Search ............................... 310/90.5, 218, 310/216, 268, 43

(56) References Cited

U.S. PATENT DOCUMENTS

| | | | | |
|---|---|---|---|---|
| 3,591,819 A | * | 7/1971 | Laing | 310/217 |
| 3,680,671 A | * | 8/1972 | Hendershot et al. | 310/216 |
| 3,803,431 A | * | 4/1974 | Inaba et al. | 310/216 |
| 4,012,083 A | * | 3/1977 | Habermann et al. | 310/90.5 |
| 4,255,684 A | * | 3/1981 | Mischler et al. | 310/216 |
| 5,105,115 A | | 4/1992 | Shinryo et al. | 310/258 |
| 5,872,409 A | * | 2/1999 | Jung | 310/90.5 |
| 6,060,810 A | * | 5/2000 | Lee et al. | 310/254 |
| 6,169,350 B1 | * | 1/2001 | Yang | 310/216 |
| 6,194,806 B1 | * | 2/2001 | Suzuki et al. | 310/216 |
| 6,465,924 B1 | * | 10/2002 | Maejima | 310/90.5 |

FOREIGN PATENT DOCUMENTS

| | | | |
|---|---|---|---|
| EP | 0419124 | 3/1991 | H02K/1/02 |
| EP | 0869517 | 10/1998 | H01F/1/24 |
| GB | 290655 | 6/1929 | |
| JP | 2000-205260 | 7/2000 | F16C/32/04 |
| JP | 2001-271836 | 10/2001 | F16C/32/04 |

OTHER PUBLICATIONS

European Search Report for EP03029453.2, dated Feb. 23, 2004.

* cited by examiner

*Primary Examiner*—Tran Nguyen
*Assistant Examiner*—J. Aguirrechea
(74) *Attorney, Agent, or Firm*—Giffin & Szipl, P.C.

(57) ABSTRACT

Stator cores for a homo-polar magnetic bearing, wherein toothed ends of stator cores around a rotor form N poles and S poles adjacent in the axial direction, and the method of manufacturing them. The stator core 10 is provided with protrusions 11 of adjacent N and S poles extended circumferentially so as to be in contact with or in close proximity to each other, and is composed of U-shaped laminated steel sheets interleaved with an insulating material, of which the center side is open when viewed from the centerline side. In addition, the core is composed of a first yoke, a second yoke and a stem unit that is a magnetic body placed and fixed between the yokes, and at least the stem unit is composed of a magnetic material powder, solidified in resin.

4 Claims, 16 Drawing Sheets

CUTTING INSIDE

Fig.1A
PRIOR ART
Fig.1B
PRIOR ART
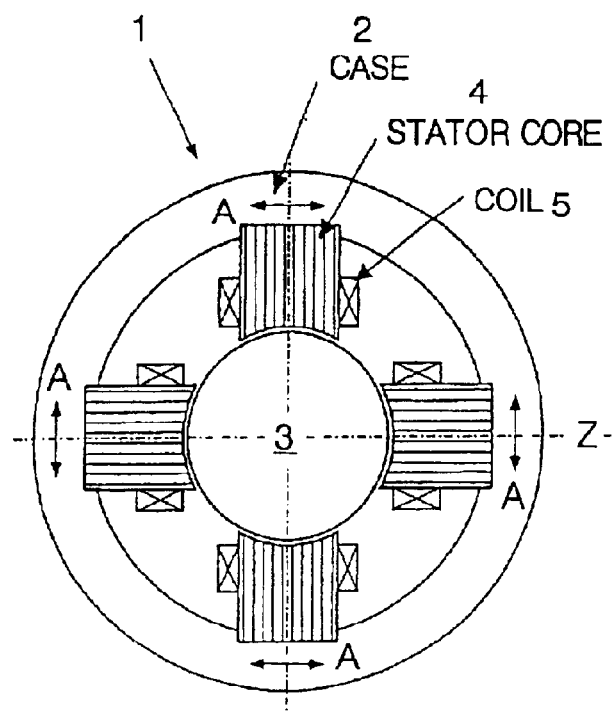
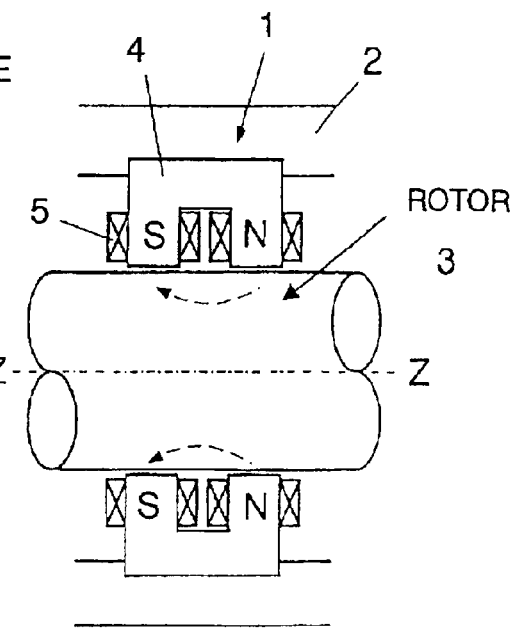
Fig.1C
PRIOR ART
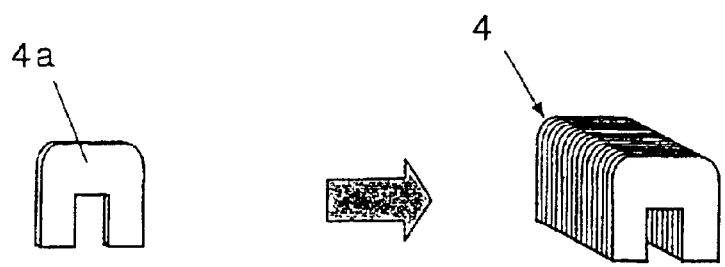

Fig.6A
Fig.6B
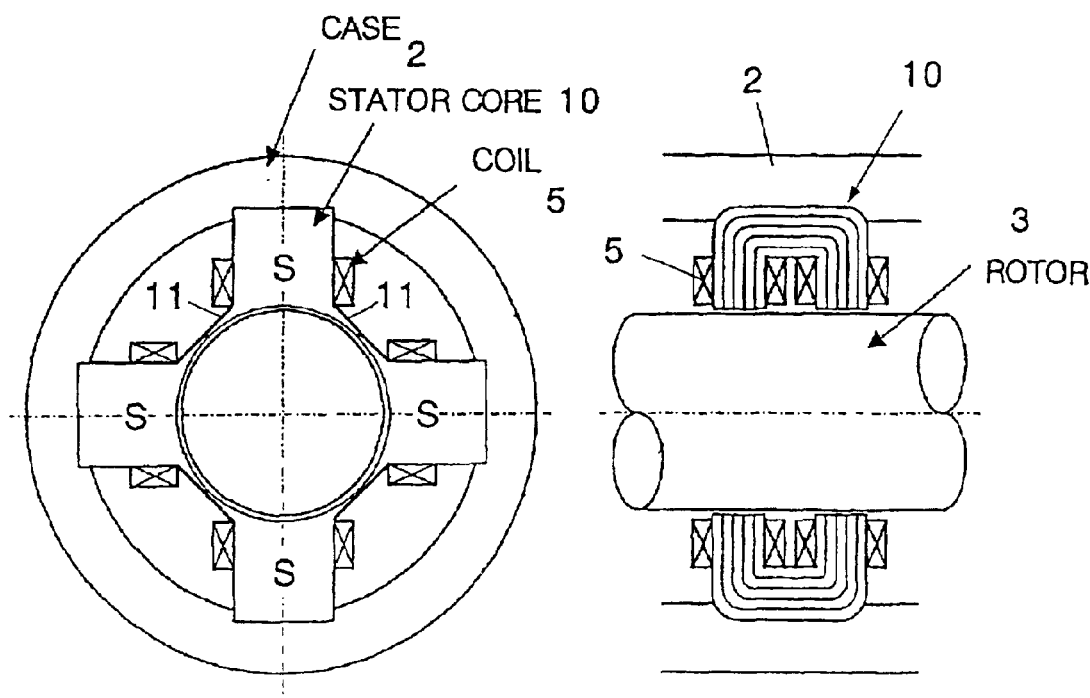
Fig.6C
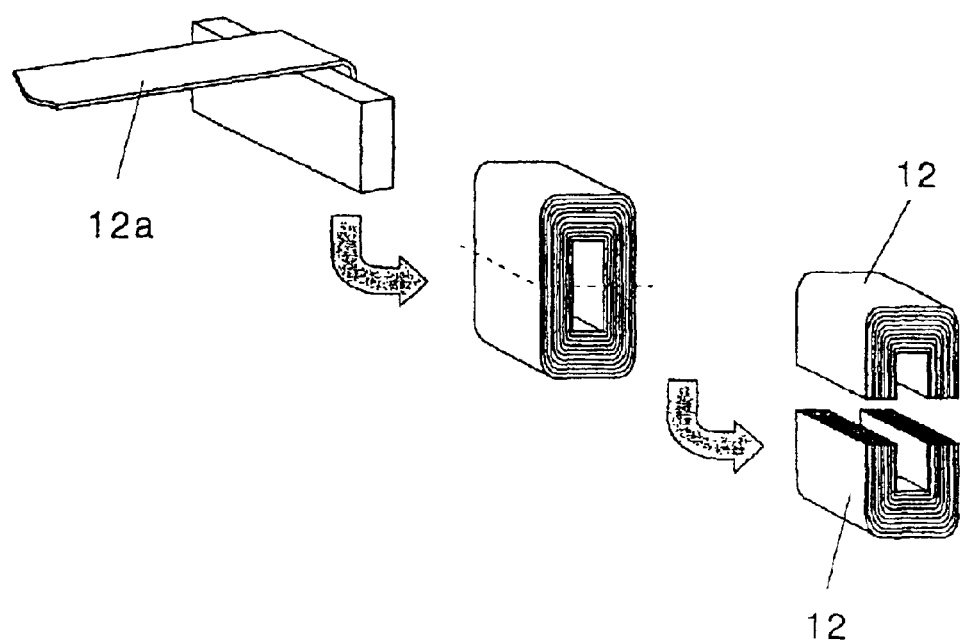

Fig.8A
Fig.8B
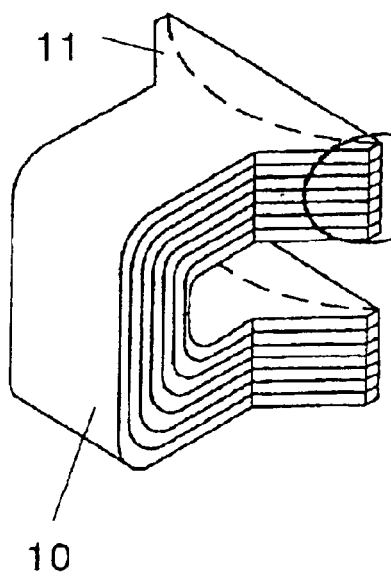
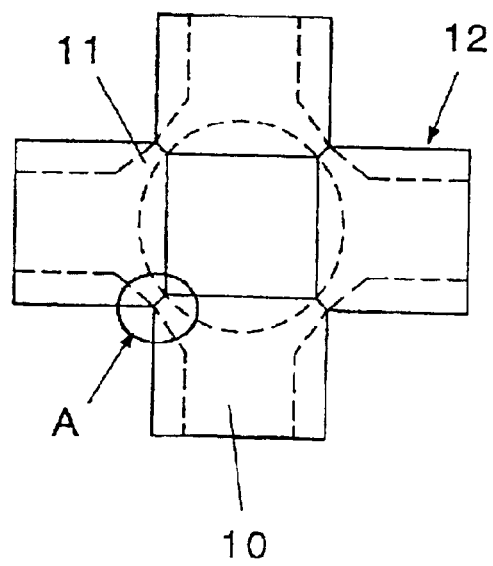

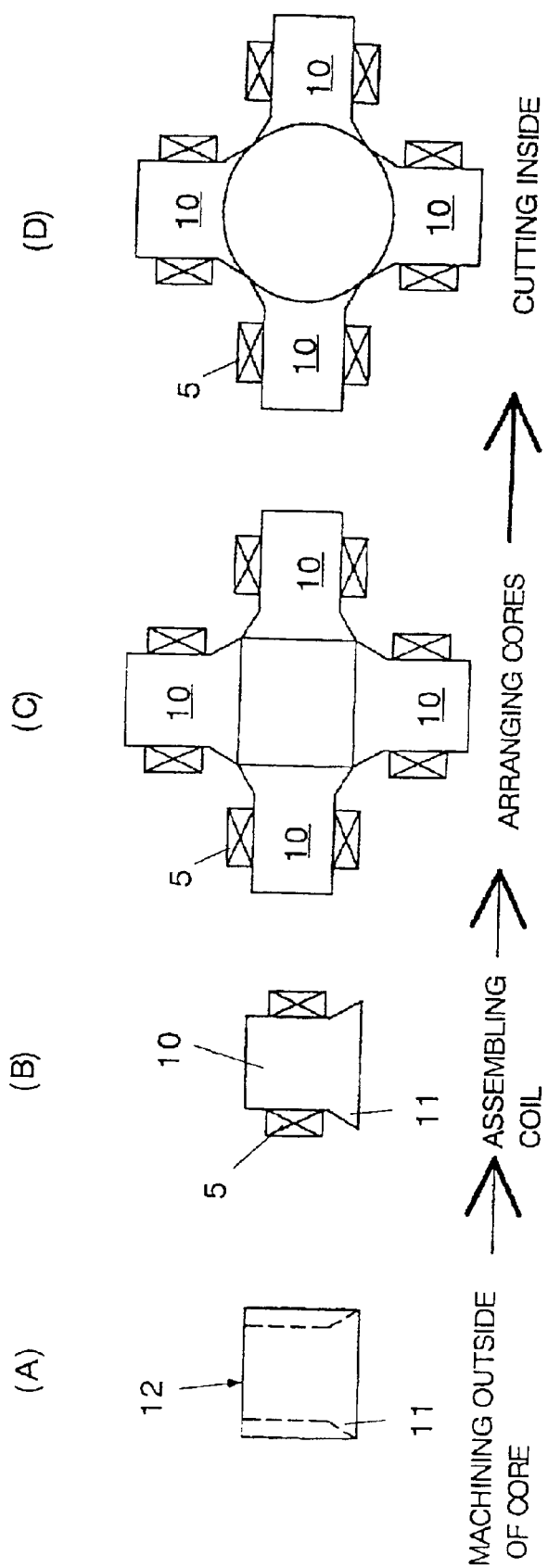

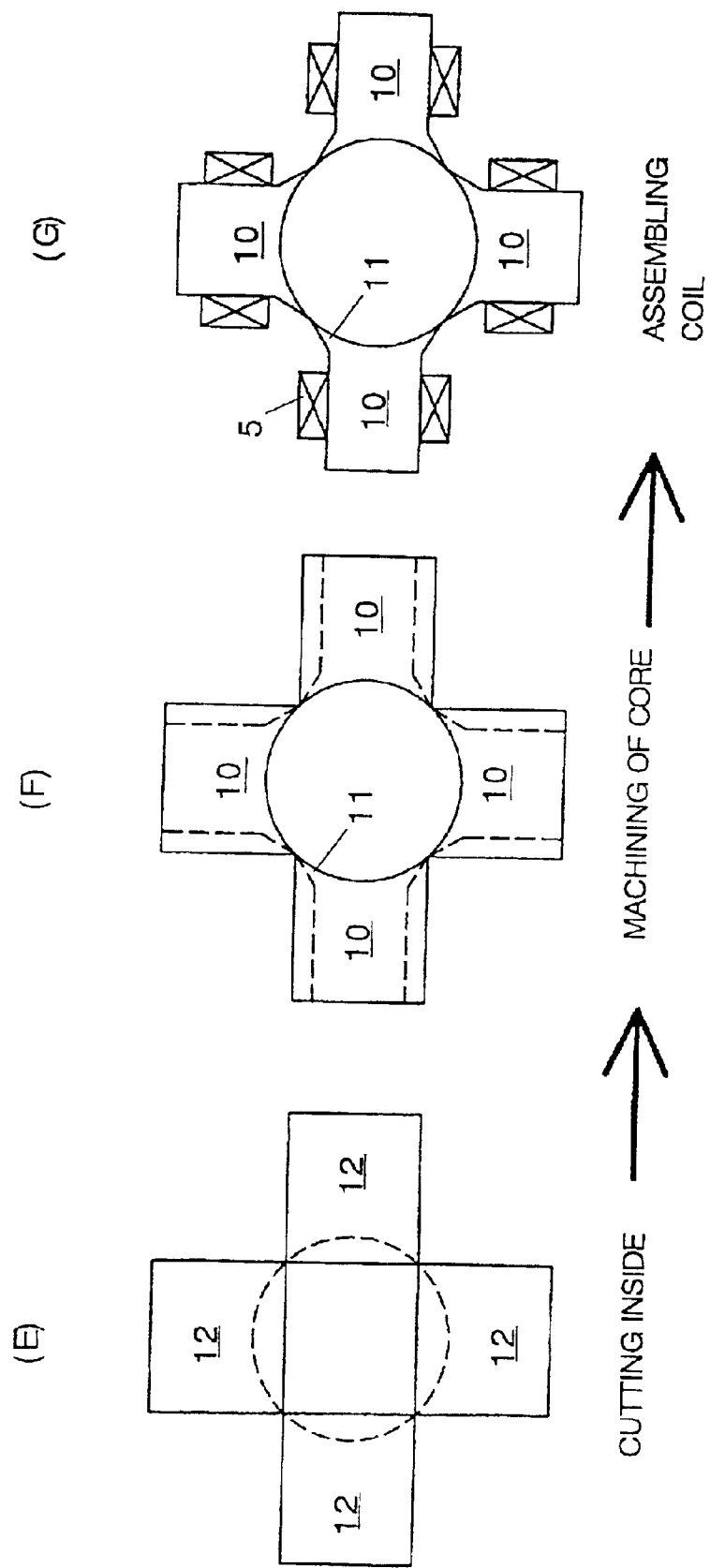

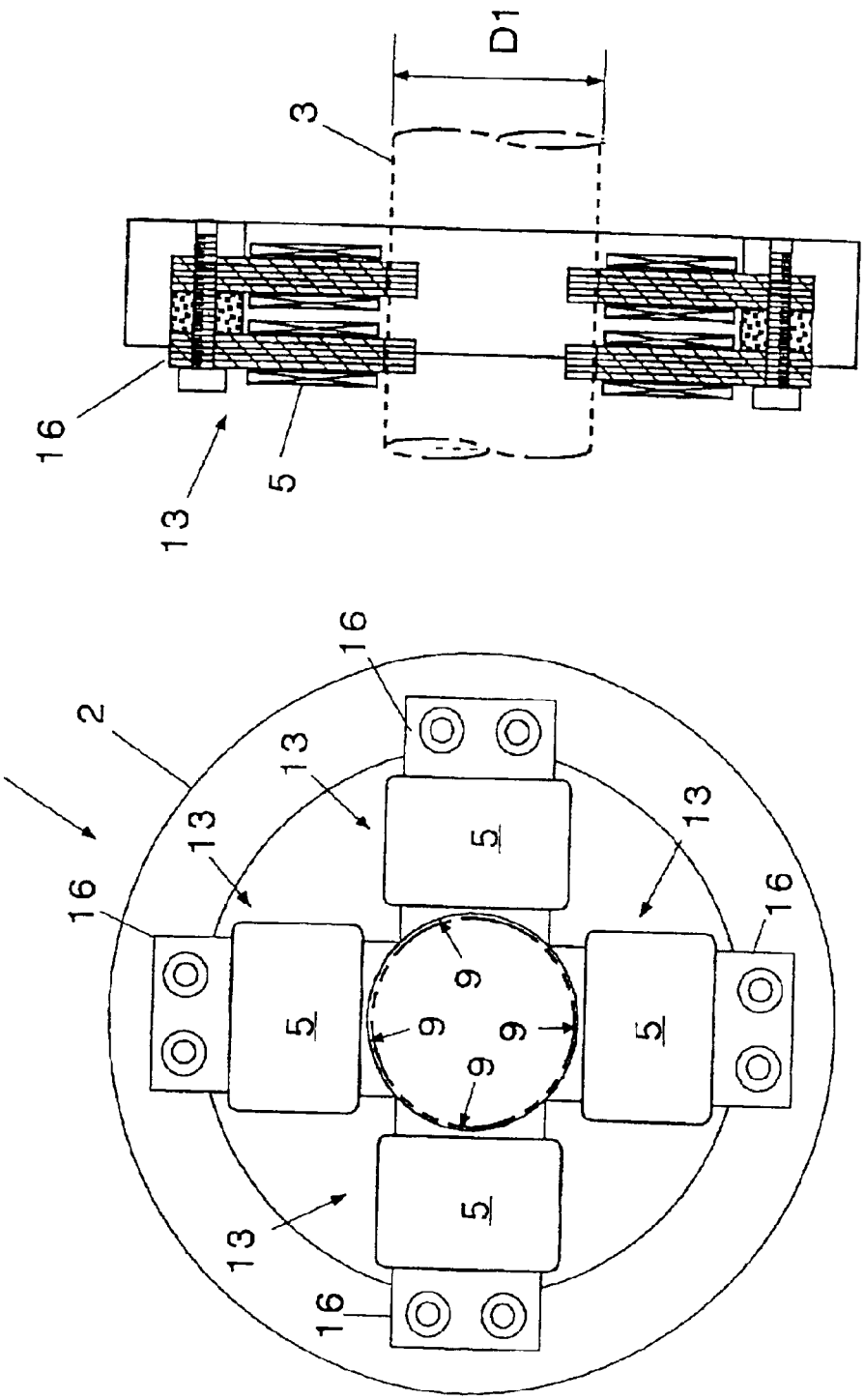

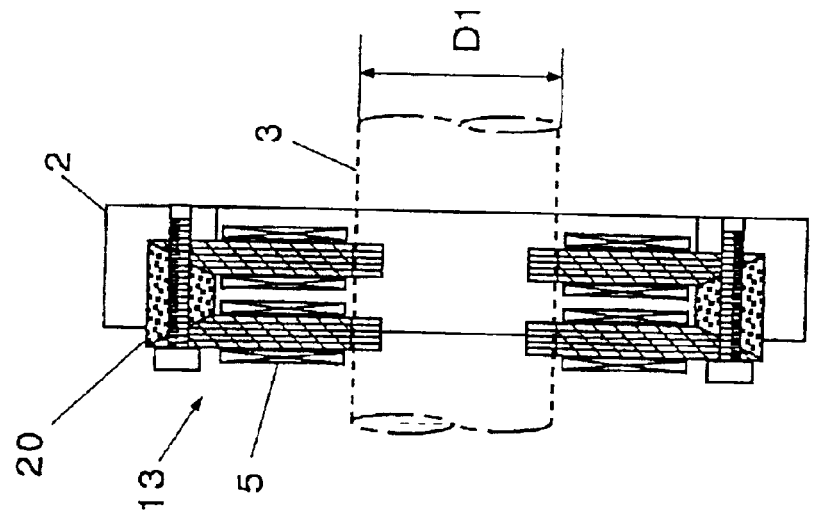
Fig.12a Type B
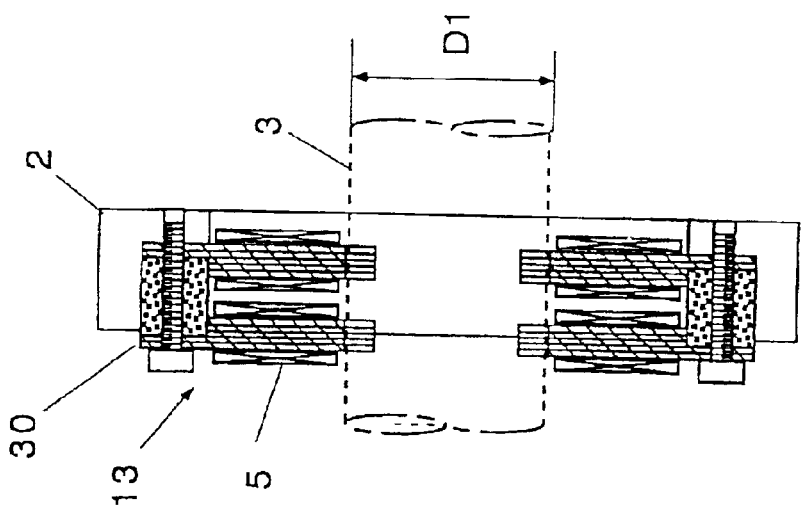
Fig.12b Type C
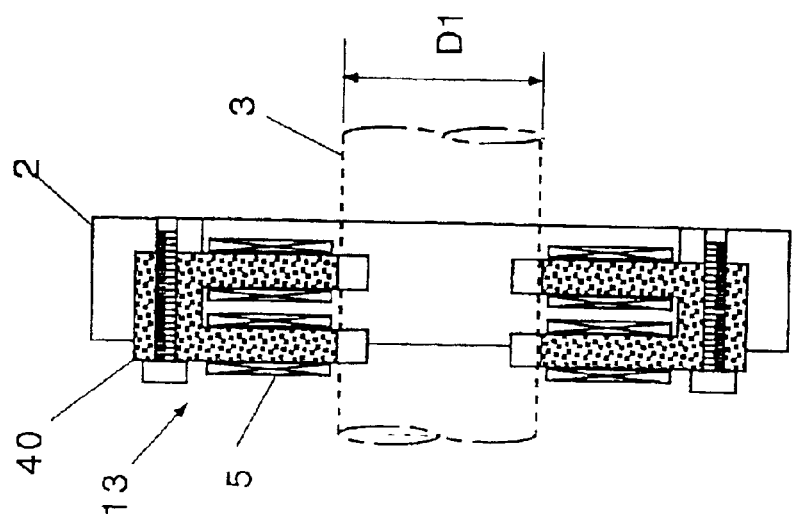
Fig.12c Type D

Type A

Type B

Type C

Type D

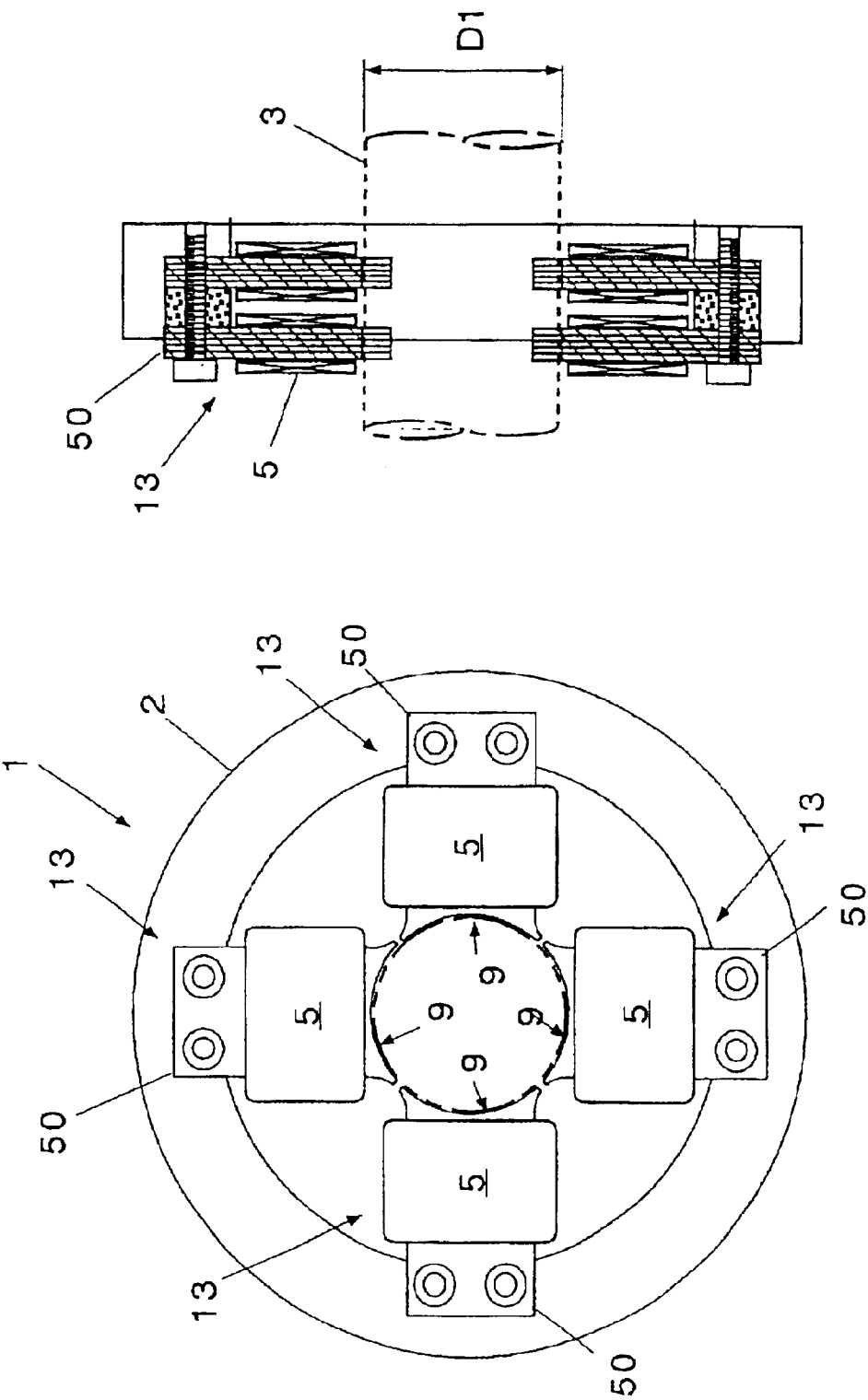

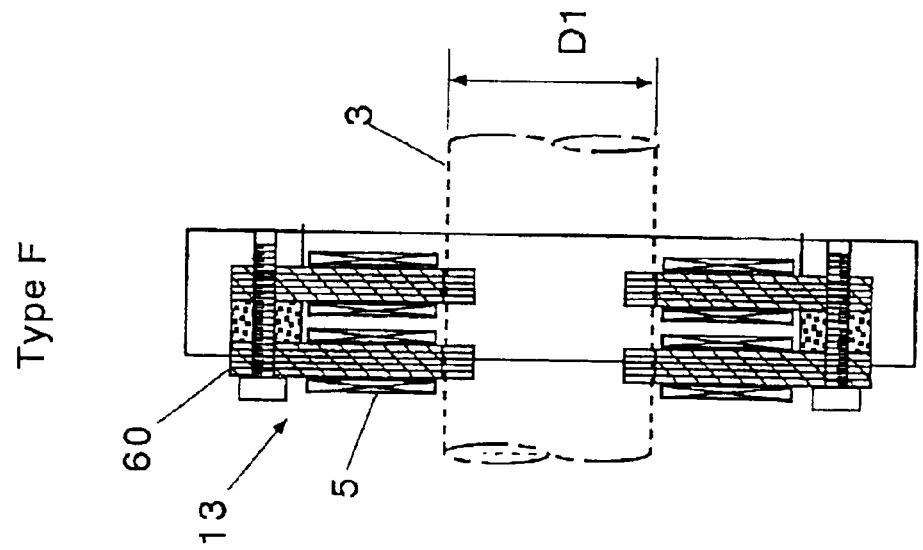
Fig.15b Type F
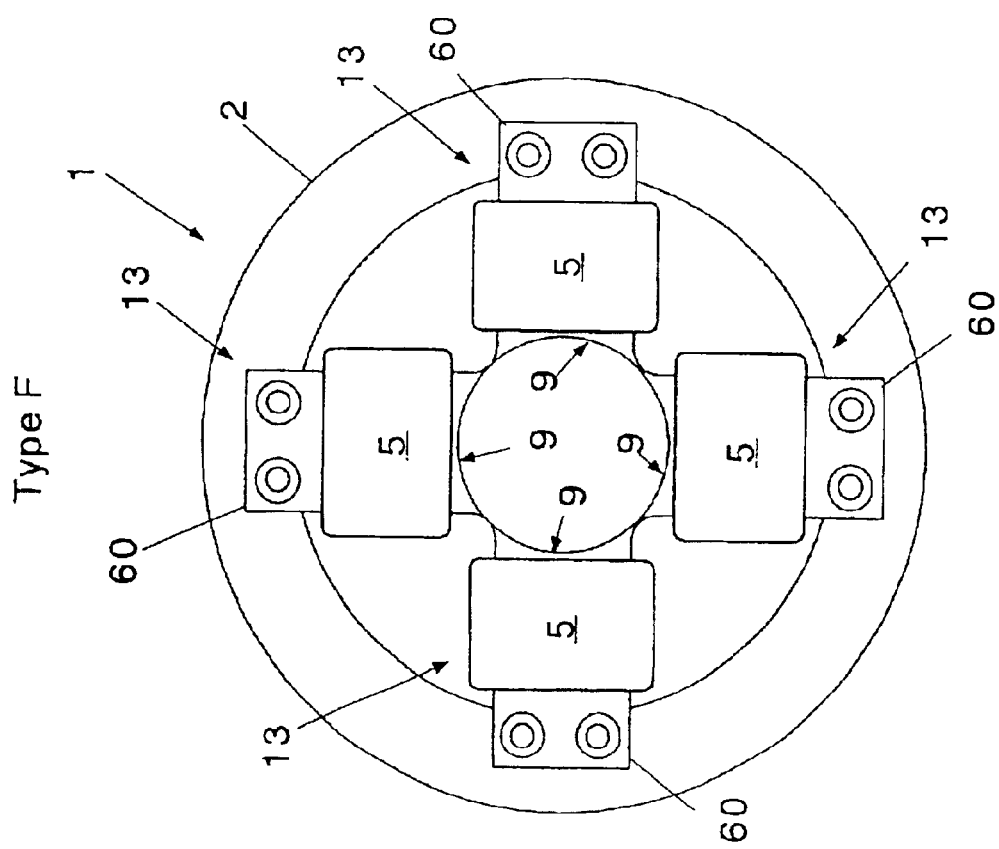
Fig.15a Type F

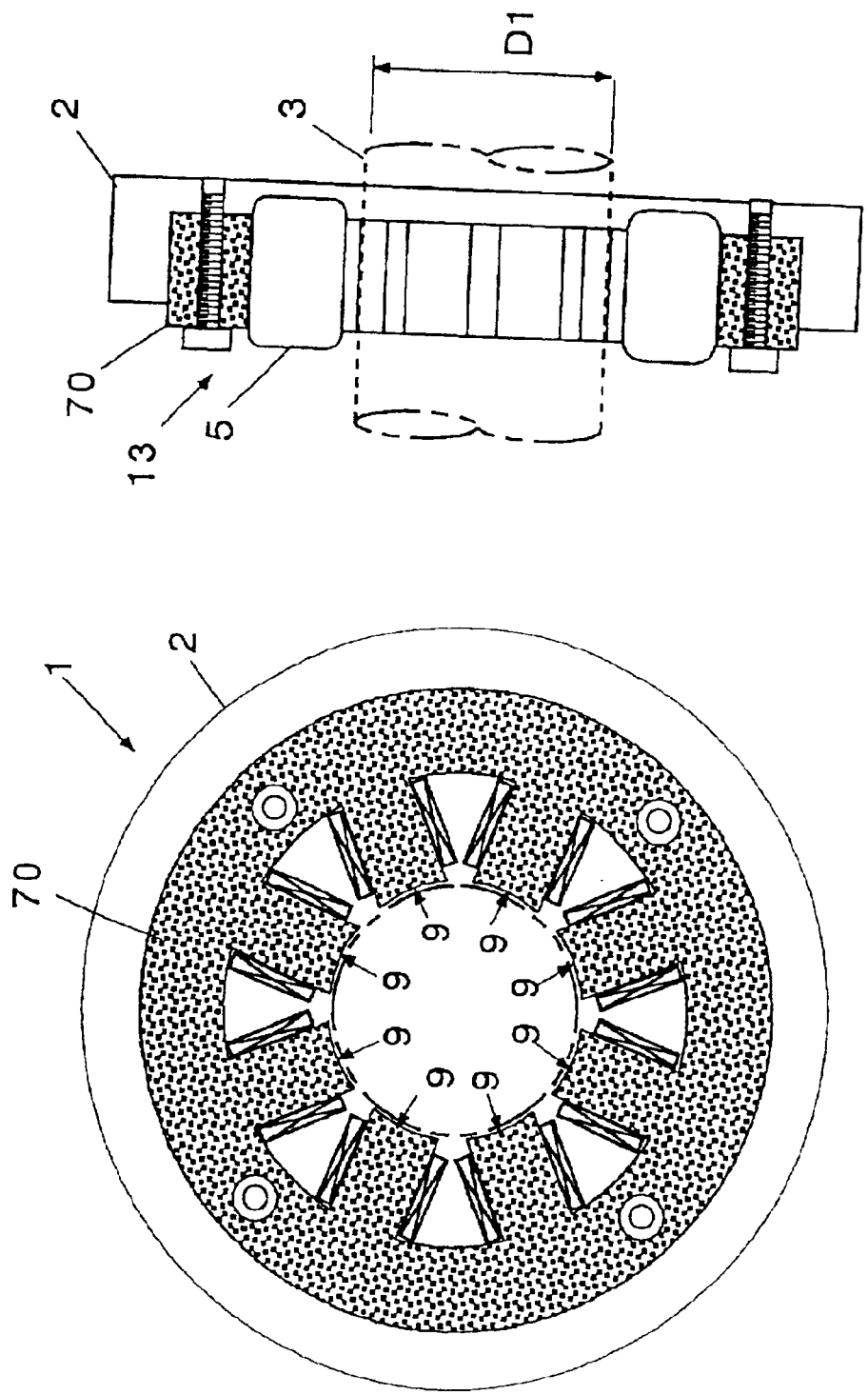

STATOR CORE FOR A MAGNETIC BEARING AND THE METHOD OF MANUFACTURING IT

BACKGROUND OF THE INVENTION

1. Technical Field of the Invention

The present invention relates to a structure of a magnetic bearing that supports a rotor without making contact, particularly a stator core for a homo-polar type of magnetic bearing, and a method of manufacturing it.

2. Prior Art

A turbo compressor can be made larger in capacity and smaller in size than a reciprocating or screw compressor, and can be easily made to an oil-free type. Therefore, turbo compressors are used often as general-purpose compressors in applications such as a compressed air source for factories, a source of air for separation, and other various processes.

Conventionally, gas bearings, sliding bearings and magnetic bearings have been used to support a high-speed rotating shaft of a high-speed motor that is connected directly to and drives a turbo compressor. In particular, a homo-polar magnetic bearing can be used to support a rotor (rotating shaft) in a contact free manner that rotates to form the high speed shaft of a high speed motor by passing magnetic flux through the shaft to produce an electromagnetic sucking force which causes the shaft to float, this being one type of radial magnetic bearing for use with shafts that rotate at a high speed (for instance, 100,000 $\text{min}^{-1}$ or more).

FIGS. 1A and 1B show typical schematic viewes of a conventional homo-polar magnetic bearing. In these figures, a homo-polar magnetic bearing 1 is composed of a rotor 3 that is arranged at the axial center of a casing 2 and parallel to it in the axial direction and can rotate at a high speed, U-shaped stator cores 4 installed inside the casing 2 with gaps between the outer surface of the rotor 3, and coils 5 that are placed around the toothed ends of the stator cores 4.

In addition, a plurality of stator cores (4 cores in FIGS. 1A and 1B) are disposed equally spaced in the circumferential direction with gaps between the outer surface of the rotor 3. Although not illustrated, stator cores 4 are arranged in the axial direction of the rotor 3 in at least 2 locations with a predetermined distance between them. Consequently, the rotor can rotate stably at a high speed. A stator core 4 is made of laminated steel sheets each of which is manufactured with an insulating adhesive material applied to its surface to bond to an adjacent thin steel sheet, and these are bonded one after another to obtain a predetermined length. As shown in FIGS. 1A and 1B, the direction A in which the laminated steel sheets 4 (lamination) are bonded is arranged to be perpendicular to the axial direction Z of the rotor 3.

As described above, in the homo-polar magnetic bearing 1, since the toothed ends of the stator cores 4 that surround the rotor 3 are close to each other in the axial direction and as the coils 5 produce the N and S poles of an electro magnet, the homo-polar magnetic bearing 1 can float the shaft in a contact free manner and support the rotor 3 by the sucking force of the toothed ends located opposite each other. Therefore, the direction of this homo-polar magnetic field is parallel to the centerline of the rotor and on the outer surface of the rotor 3 as shown by the dashed arrow lines in FIG. 1B.

FIG. 1C is a schematic view that shows a conventional process for assembling laminated steel sheets to form a conventional stator core. Normally, the stator core 4 of the homo-polar magnetic bearing 1 is manufactured by making thin rectangular steel sheets 4a coated with an insulating material, by a method such as punching, and assembling these punched steel sheets 4a one after another, to produce a laminated stator core 4.

However, when the inner surfaces of the aforementioned stator cores 4 (laminated steel sheets) are cut by a rotary cutting process, a large cutting load is applied to the edges of the laminated steel sheets 4a in a lateral direction, so the tips of the laminated steel sheets 4a are bent, and the insulating material is crushed in the direction of rotation by the above-mentioned bending load, which is a practical problem. Consequently, the steel sheets contact each other resulting in an increase in the eddy currents in the stator unit, so another problem occurs due to the reduced levitation force applied to the rotor 3, poor rotating characteristics, etc. Still another problem is that the laminated material is peeled away by the edge of the cutting tool. Even if the above-mentioned process of cutting in a lathe is replaced by using a vertical boring machine etc. to cut the inner surfaces of laminated steel sheets, because there are gaps between adjacent steel sheets, there is the additional problems that smooth cutting and true roundness cannot be easily ensured.

On the other hand, the inventors of the present invention have proposed the homo-polar magnetic bearing apparatus configured as shown in FIGS. 2 and 3, with the aim of improving the characteristics of conventional homo-polar magnetic bearings (unpublished Japanese patent application No. 88402/2000). According to this magnetic bearing apparatus, adjacent N poles or S poles are connected together in the circumferential direction, or are located close to each other with a small gap between them. The homo-polar magnetic bearing with this configuration has the advantage that it is capable of greatly reducing the production of eddy currents and the heat and eddy current losses generated in the rotor.

However, if the stator cores 4 of the homo-polar magnetic bearing shown in FIGS. 2 and 3 are produced using laminated steel sheets with small eddy current losses, as shown in FIG. 1, the laminated steel sheets become so thin in the peripheral web 4b that they fail, crush or peel when processed, which is a practical disadvantage.

More explicitly, in the homo-polar magnetic bearing with the structure shown in FIGS. 2 and 3, the stator cores 4 are connected together circumferentially or located close to each other, so the distribution of magnetic flux in the rotor is more uniform and losses can be reduced. Conversely, however, if stator cores 4 in which the tips are connected together are formed with a conventional laminated structure, the laminated steel sheets are so small in the portions where adjacent magnetic poles are connected together that the laminated structure may collapse when the cores are machined, therefore, it is very difficult to machine the cores without detaching, crushing or peeling the laminations.

Another problem in a conventional apparatus is that amorphous materials cannot be used because they are difficult to laminate, despite the advantages of having a high electrical resistance and permeability, so the choice of electromagnetic sheet steel is restricted.

Next, the structure of a conventional homo-polar radial magnetic bearing is described in more detail than before by referring to FIGS. 4 and 5. FIG. 4a is a front view of a conventional homo-polar radial magnetic bearing, and FIG. 4b is the corresponding side sectional elevation. FIG. 5 is an isometric view of the stator core of a conventional homo-polar radial magnetic bearing.

The homo-polar radial magnetic bearing 1 is provided with a casing 2, a plurality of electromagnetic components 13 and a rotating shaft 3. The rotating shaft 3 is made of a material which is magnetic at least on the surface thereof, with an outer diameter of D1 and a length determined by the rotor. The rotor 3 is disposed coaxially with the centerline of the casing 2, parallel thereto in the longitudinal direction, and is supported so that it can rotate freely. The plurality of electromagnetic components 13 support the rotor 3 so that it can rotate freely, and are arranged around the rotor 3. For instance, four electromagnetic components are connected together to form a set, and sets of electromagnetic components 13 support the rotor 3 at 2 locations. At each supporting location, 4 electromagnetic components are equally spaced around the rotor.

The electromagnetic components 13 are provided with stator cores 80 and coils 5. The stator core 80 is provided with two yokes 6 and 8 and a stem portion 7 as shown in FIG. 5. A yoke 6 or 8 is a column-shaped portion one end of which is opposite the outer surface of the rotor 3 with a gap between them that induces a magnetic pole on the surface 9. The two yokes 6, 8 are arranged axially with a predetermined spacing between each other. The stem portion 7 is a magnetic structure between the other ends of the two yokes 6, 8 connecting the yokes together. The stator core 80 is a thick U-shaped unit comprised of the two yokes 6, 8 and the stem portion 7 without gaps, and is installed in a recess on the inner periphery of the casing 2.

The coil 5 is a bundle of wire. The wire is wound in several layers around the yokes 6, 8 with an air gap between the coil and yoke. The coil 5 is a block with the same shape as the section of the yoke 6 or 8 with an air gap between the coil and yoke.

The structure of the stator core 80 is described in further detail referring to FIG. 5. The stator core 80 is made of laminated steel sheets, consisting of a plurality of magnetic steel sheets 81 and an insulating material. The magnetic steel sheet 81 is a thin steel sheet with a thickness T, shaped in the aforementioned U shape. The insulating material is a non-conducting material and is applied between the plurality of magnetic steel sheets 81. When the stator core 80 is assembled as an electromagnetic component, it is laminated in the circumferential direction of the rotor. The magnetic steel sheet 81 of the illustrated stator core 80 is rectangular in shape with a width W1 and a height H1, provided with a slot W2 wide and H2 in height, on the side forming the magnetic pole surface 9. The stator core 80 is made of a plurality of laminated magnetic steel sheets 81 with a predetermined length of L1.

In another type of electromagnetic component, the width of a stator core 80 near the magnetic pole surface 9 is extended circumferentially in the direction of the outer surface of the rotor, and comes in close contact with the magnetic pole surfaces of the adjacent electromagnetic components of the stator core.

According to still another type of electromagnetic component, the width of a stator core 80 near the magnetic pole surface 9 is extended circumferentially in the direction of the outer surface of the rotor, and is integrated with the magnetic pole surface of an adjacent electromagnetic component of the stator core 80.

When the aforementioned stator core for a magnetic bearing is manufactured, thin sheet steel with a thickness T is punched using dies, to produce U-shaped magnetic steel sheets.

Next, the magnetic pole surface 9 of the stator core for a magnetic bearing must be machined into a circular arc using a lathe etc.; at this time, the rotation causes a cutting load that acts laterally on the edges of the laminated steel sheets, so the tips of the electromagnetic steel sheets are bent; due to this bending, the insulation material is crushed in the direction of rotation, often resulting in adjacent electromagnetic steel sheets coming in contact with each other. The problem encountered when this happens is that large eddy currents are produced in the electromagnetic steel sheets.

Another problem that the laminated steel sheets become separated during cutting, may occur.

There is also another problem that if a vertical boring machine is used instead of a lathe, differences are produced at the edges between adjacent laminated steel sheets, and a true, smooth circle cannot be ensured.

With the type of stator core for a magnetic bearing in which the magnetic pole surface of the stator core is extended over the outer surface of the rotor, since the laminated steel sheets in the extended portions become very thin, they may cause problems by becoming detached, crushed or peeled during machining.

SUMMARY OF THE INVENTION

The present invention aims at solving the aforementioned problems. That is, the first object of the present invention is to provide a stator core for a magnetic bearing, such that even if there are portions extended circumferentially around the core, the core can be made with laminated steel sheets, can avoid the laminated steel sheets becoming detached, crushed or peeled, can be efficiently cut and processed, can also be made of an amorphous material which cannot otherwise be easily laminated, thus enabling the manufacturing and processing costs to be reduced, and can greatly reduce the eddy currents generated in the stator core, and the manufacturing method thereof.

The second object of the present invention is to offer a stator core for a magnetic bearing, that has a structure which allows a high utilization of the component material, or the core can be processed with high precision, or one in which the generation of eddy currents is kept to a minimum.

To achieve the above-mentioned first object, the present invention provides such a stator core for a magnetic bearing that is a stator core for a homo-polar magnetic bearing in which the toothed ends of the stator cores are close to each other in the axial direction and form N poles and S poles, wherein the stator cores (10) have portions (11) protruding from adjacent N poles and S poles that are extended circumferentially so as to be in contact with or in close proximity to each other and are made of laminated steel sheets that are interspaced with an insulating material and have a U-shape which is open on the center side when viewed from the side of the shaft.

Using this configuration, the production of eddy currents can be drastically reduced, thereby the rotor losses, due to the heat generated by the eddy currents can be greatly reduced. Because the stator core (10) is composed of laminated steel sheets with a U shape such that the center side is open when viewed from the side of the axis of the shaft, even the protruding portions (11) that are in contact with or are located close to each other can be integrated into one body together with the coils. Therefore, the laminated steel in the protruding tips (protruded portions) can be an integral part of the same steel sheet as that in the location of the coils, so a laminated structure can withstand processing work without becoming collapsed, and also avoiding becoming detached, crushed or peeled, thereby the sheet can be efficiently cut and processed.

Moreover, because the cores can be processed after being formed and cut, even an amorphous material etc. that cannot be easily laminated can be used.

According to a preferred embodiment of the present invention, the aforementioned U-shaped laminated steel cores (12) are manufactured from a continuous steel sheet (12a) coated with an insulation material that is wound into a rectangular shape and then cut into equal parts.

Using this configuration, such stator cores (10) have protruding portions (11) composed of adjacent N and S poles extending circumferentially so as to be in contact with or in close proximity to each other and are composed of U-shaped laminated steel sheets with an insulating material between the laminations and the U shape is such that the center side is open when viewed from the side of the shaft, the cores can be processed quickly and efficiently by processing the outer shape and cutting the inside of the cut cores (12).

In addition, the cut cores (12), are wound into a rectangular shape with a center opening of predetermined dimensions and can be formed quickly and easily. Moreover, by dividing this wound rectangular shape, into two equal parts with a cutting machine, U-shaped laminated steel sheets each of which is isolated with an insulating material can be easily fabricated. Furthermore, high-cost punching dies need not be used, but simple and compact wrapping dies can be used to manufacture the cut cores, so the manufacturing costs can be reduced, laminating work can be omitted, and therefore, productivity can be improved. In addition, the scrap material that might otherwise be produced from the center parts of steel sheets during punching work when using punching dies can be avoided, therefore, the yield of steel sheets can be improved drastically.

In addition, the present invention presents a method of manufacturing cores for a magnetic bearing, including an outside machining step (A) wherein the outside surfaces of the cut cores (12) fabricated by wrapping a continuous steel sheet coated with an insulating material into a rectangular shape and then cut into equal parts are machined to leave protrusions (11), a coil assembling step (B) for assembling coils onto cut cores after the outside has been machined, a core assembling step (C) in which a plurality of cut cores are assembled at the required locations, and an inner cutting step (D) for cutting the inside of a plurality of cut cores after assembly at the required locations.

Using the aforementioned method, cutting the inside of a plurality of cut cores can be completed in one operation, and the cores can be machined with an excellent concentricity. In addition, the inner surfaces of the ends of the teeth can be cut in the direction of the sheet laminations and in the plane of the laminations during rotation, without imposing a biasing or bending load, therefore, the cut surfaces of the steel sheets remain smooth and regular without the insulating material becoming crushed, broken or peeled, so that a satisfactory excellent roundness can be preserved.

In addition, the present invention offers a method of manufacturing cores for a magnetic bearing, that includes an inside cutting step (E) wherein a plurality of cut cores (12) fabricated by wrapping a continuous steel sheet coated with an insulating material into a rectangular shape and, forming and cutting it into equal parts are assembled in the required positions and the inside thereof is cut, an outside machining step (F) in which the outside of the plurality of cut cores are machined leaving protrusions (11), and a coil assembling step (G) wherein the plurality of cut cores of which the outside has been machined are fitted with coils.

According to this method of the present invention, cutting the inner surface is required twice, however, the number of machining steps can be reduced. In addition, when the inner periphery of the toothed ends is cut during rotation, the cutting work can be carried out in the direction of the lamination and in the horizontal plane of the steel sheets on the inner periphery of the toothed ends, without producing a bias load or deflection, therefore, the cut edges of the steel sheets can be kept smooth without any irregularity at the edge of each cut, and the peripheries of the cores can be kept smooth and truly circular without any collapsing, tearing or peeling of the insulating material.

To achieve the aforementioned second object of the present invention, the invention provides stator cores for a magnetic bearing, composed of a first yoke (6) that is used for a homo-polar magnetic bearing for supporting a rotor (3) provided with a supporting surface made of a magnetic material, and one end of which forms the magnetic pole surface opposite the above-mentioned supporting surface with a predetermined width to pass magnetic flux, that is, a first pole body, a second yoke (8) one end of which forms a magnetic pole surface opposite the aforementioned supporting surface with a predetermined width to pass the magnetic flux, that is, a second pole body, and a stem unit (7) that is arranged between and in close contact with the other ends of the above-mentioned first yoke and the aforementioned second yoke and passes the magnetic flux between them, wherein the aforementioned first yoke (6) and the above-mentioned second yoke (8) are regularly arranged opposite each other in the lateral direction of the aforementioned pole body, and at least the stem unit (7) is fabricated from a magnetic material powder, solidified in a resin.

Using this configuration, since the first yoke (6), stem unit (7) and second yoke (8) are integrated into a U-shape and the stem unit (7) is made of the magnetic material powder solidified in resin, when the magnet is energized, the flux passes through the first yoke (6), rotor (3), second yoke (8) and stem unit (7), in a closed path; since the magnetic pole surfaces at the ends of the first yoke (6) and the second yoke (8) support the rotor (3) at the supporting surfaces, and as the magnetic material powder solidified in resin produces only a small amount of eddy current loss, eddy currents are not generated in the stem unit (7), so a magnetic bearing with few losses can be realized.

In the stator cores for a magnetic bearing according to the present invention, the aforementioned first pole body (6) is a laminated body in which magnetic steel sheets are laminated in the direction orthogonal to a line normal to the above-mentioned magnetic pole surface, interleaved with a non-conducting substance, and the above-mentioned second pole body (8) is a laminated body fabricated from magnetic steel sheets laminated in the direction orthogonal to a line normal to the aforementioned magnetic pole surface, with a non-conducting substance between the laminations.

According to the configuration described above, since the first pole body (6) and the second pole body (8) are provided with laminated bodies fabricated from magnetic steel sheets laminated in the direction orthogonal to a line normal to the above-mentioned magnetic pole surfaces, with a non-conducting substance between the laminations, eddy current losses due to flux passing through the yokes can be suppressed, so a magnetic bearing with further reduced losses can be produced.

In addition, the stator cores for a magnetic bearing according to the present invention are contrived in such a manner that the aforementioned first pole body (6) is a laminated body fabricated from magnetic steel sheets laminated in the lateral direction with a non-conducting substance interleaved between each sheet, and the above-mentioned second pole body (8) is a laminated body in which the magnetic steel sheets are laminated in the lateral direction with a non-conducting substance sandwiched between each sheet.

In this configuration, since the first pole body (6) and the second pole body (8) have laminated bodies made of magnetic steel sheets laminated in the lateral direction with a non-conducting substance sandwiched between the sheets, eddy current losses generated when the magnetic flux flows through yokes can be suppressed, so a magnetic bearing with further reduced losses can be offered in practice.

Furthermore, the stator cores for a magnetic bearing that supports a rotor (3) with a supporting surface composed of a magnetic material according to the present invention are formed with N-pole magnetic pole surfaces opposite the aforementioned supporting surface and S-pole magnetic pole surfaces facing the above-mentioned supporting surface, and are made of a magnetic material powder, solidified in resin.

Using the above-mentioned configuration, N-pole magnetic pole surfaces and S-pole magnetic pole surfaces are opposite the supporting surface, therefore, when magnetic flux is passed through the stator cores of a magnetic bearing, N-pole magnetic pole surfaces and S-pole magnetic pole surfaces support the supporting surface of the rotor; because the magnetic material powder, solidified in resin, produces a small amount of eddy current losses, eddy current losses can be suppressed so realizing a magnetic bearing with reduced losses.

Moreover, the stator cores for a magnetic bearing according to the present invention incorporate the rotating shaft of the rotor, eddy current losses are reduced, so the magnetic bearing for a rotor with a small amount of losses can be developed.

Other objects and advantages of the present invention are revealed in the following paragraphs referring to the attached drawings.

BRIEF DESCRIPTION OF DRAWINGS

FIGS. 1A through 1C are schematic viewes showing the configuration of a conventional homo-polar magnetic bearing.

FIGS. 6A through 6C show the stator cores for a magnetic bearing according to the present invention.

FIGS. 8A and 8B are schematic viewes of the second embodiment of the stator cores based on the present invention.

FIG. 9 shows the method of manufacturing stator cores according to the present invention.

FIG. 10 is another view showing the method of manufacturing stator cores according to the present invention.

FIGS. 11a and 11b are a front view and side elevation of the third embodiment of the stator cores according to the present invention.

FIGS. 12a through 12c are side elevations of the fourth and fifth embodiments of stator cores according to the present invention.

FIGS. 14a and 14b are a front view and side elevation of the seventh embodiment of the stator cores according to the present invention.

FIGS. 15a and 15b show front and side views of the eighth embodiment of stator cores according to the present invention.

FIGS. 16a and 16b show a front view and side elevation of the ninth embodiment of stator cores according to the present invention.

DESCRIPTION OF PREFERRED EMBODIMENTS

Figure 2A:
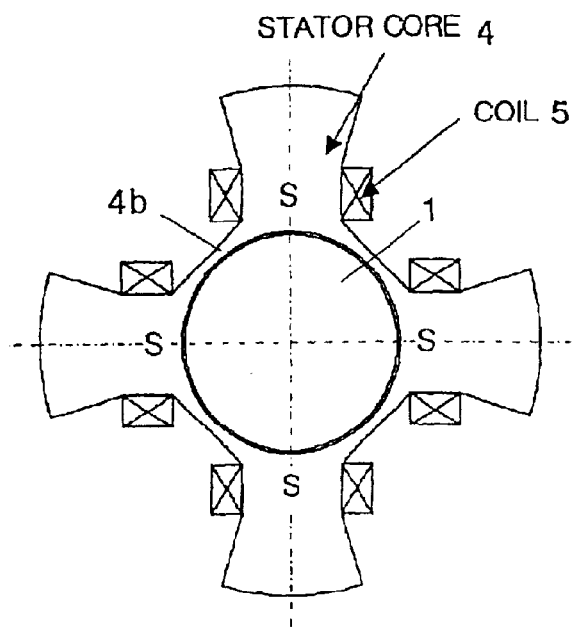
FIGS. 2A and 2B show the configuration of the homo-polar magnetic bearing related to the prior application.
Figure 2B:
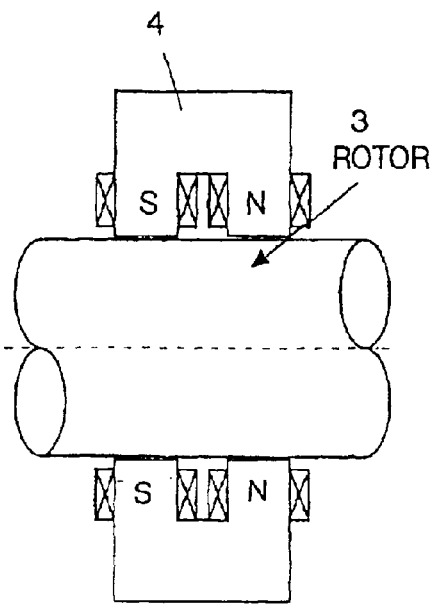
Figure 3:
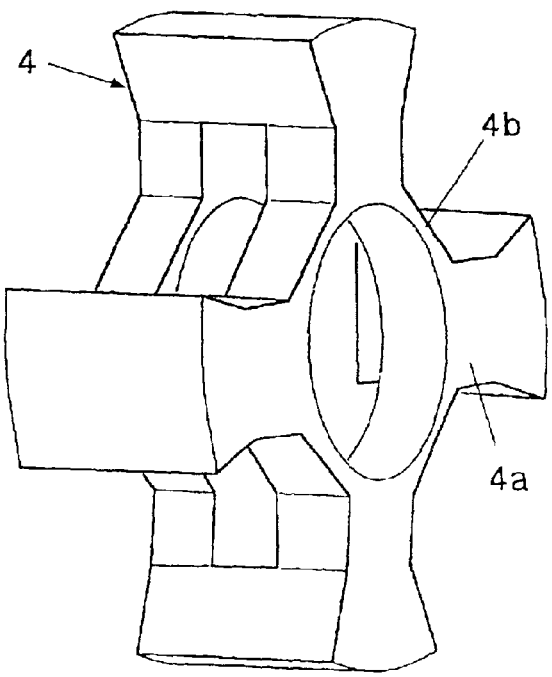
FIG. 3 is an isometric view of the stator cores shown in FIG. 2.
Figure 4B:
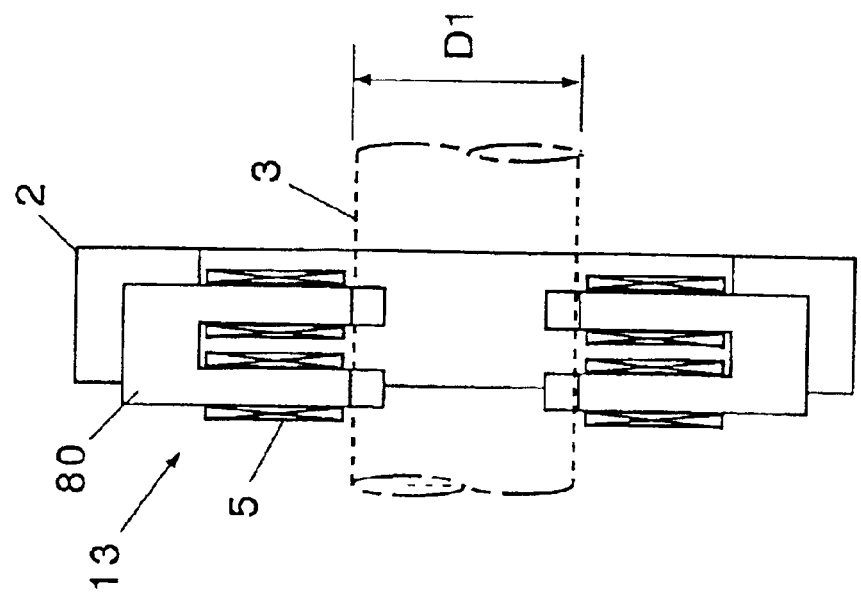
FIGS. 4a and 4b are the front plan view and side elevation of a conventional homo-polar radial magnetic bearing.
Figure 4A:
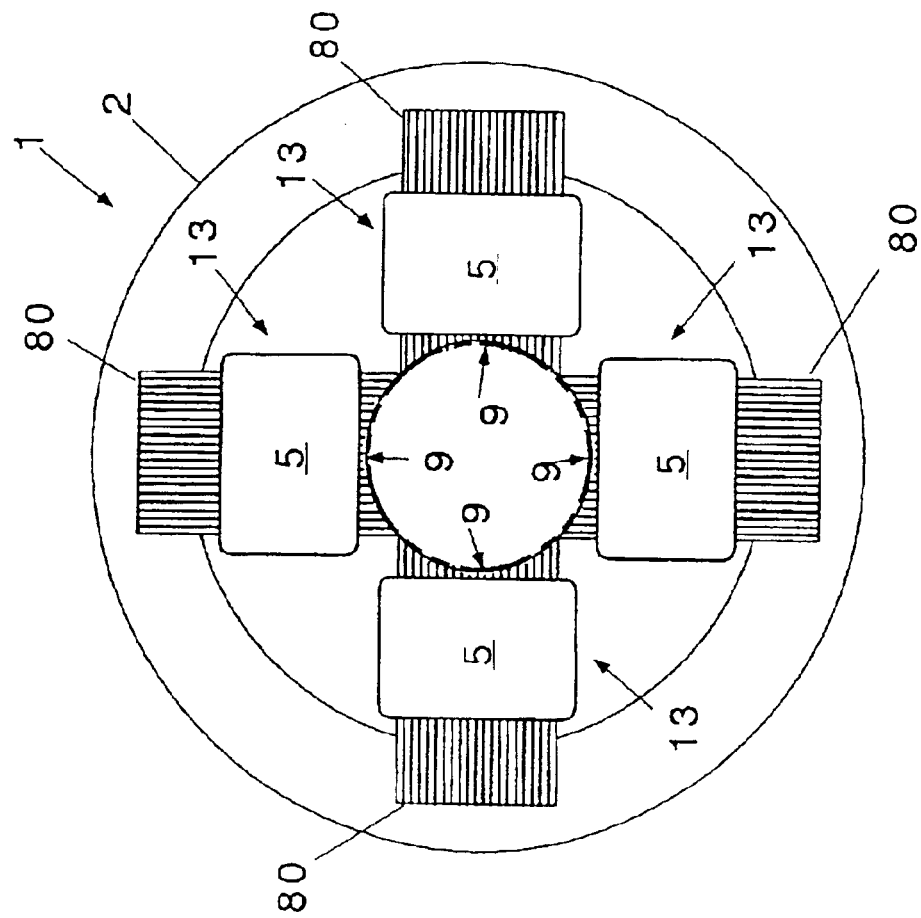
Figure 5:
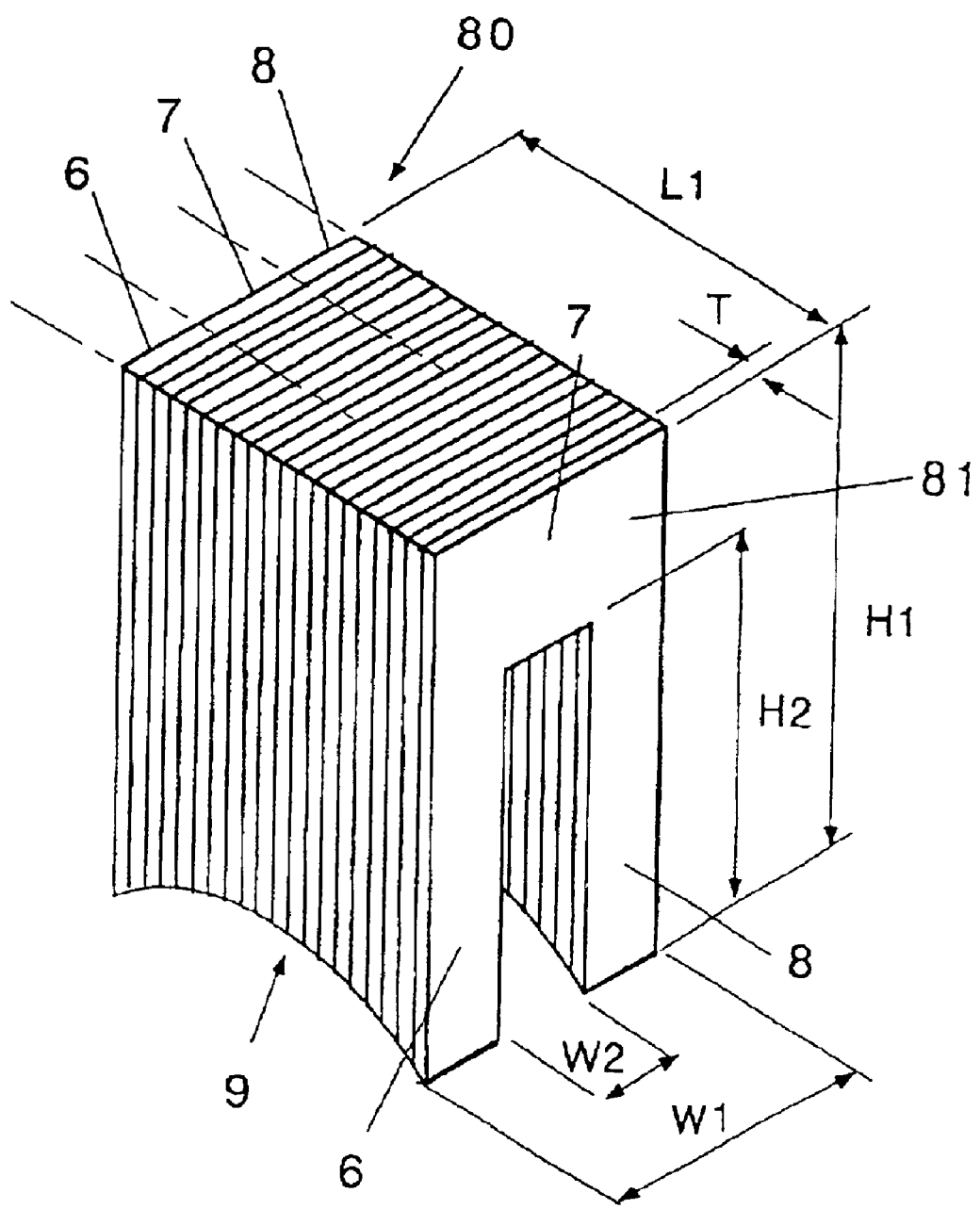
FIG. 5 is an isometric drawing showing conventional stator cores for a homo-polar radial magnetic bearing.

Preferred embodiments of the present invention are described below referring to the drawings. Common portions shown in each drawing are identified with the same numbers, and no duplicate descriptions are given.

(First Embodiment)

FIGS. 6A and 6B show stator cores for a magnetic bearing according to the present invention. As shown in the figures, the magnetic bearing incorporates stator cores for a homo-polar magnetic bearing, like that shown in FIG. 13, wherein the toothed ends of the stator cores 10 form N poles and S poles adjacent to each other in the axial direction, and surround a rotor 3.

In the stator cores for a magnetic bearing according to the present invention, the stator cores 10 are provided with protrusions 11 extending in the circumferential direction from adjacent N and S poles so as to be in contact with or in close proximity to each other.

FIG. 6C typically shows the method of manufacturing U-shaped laminated steel sheets for the stator cores 10. In FIG. 6C, U-shaped laminated steel sheets for the cut cores 12 are manufactured by wrapping a continuous steel sheet 12a coated with an insulation material into a rectangular shape, forming it and cutting it in equal parts.

Therefore, the stator cores 10 according to the present invention are composed of U-shaped laminated steel sheets interleaved with insulating material, and with the center sides open when viewed from the centerline.

Figure 7A:
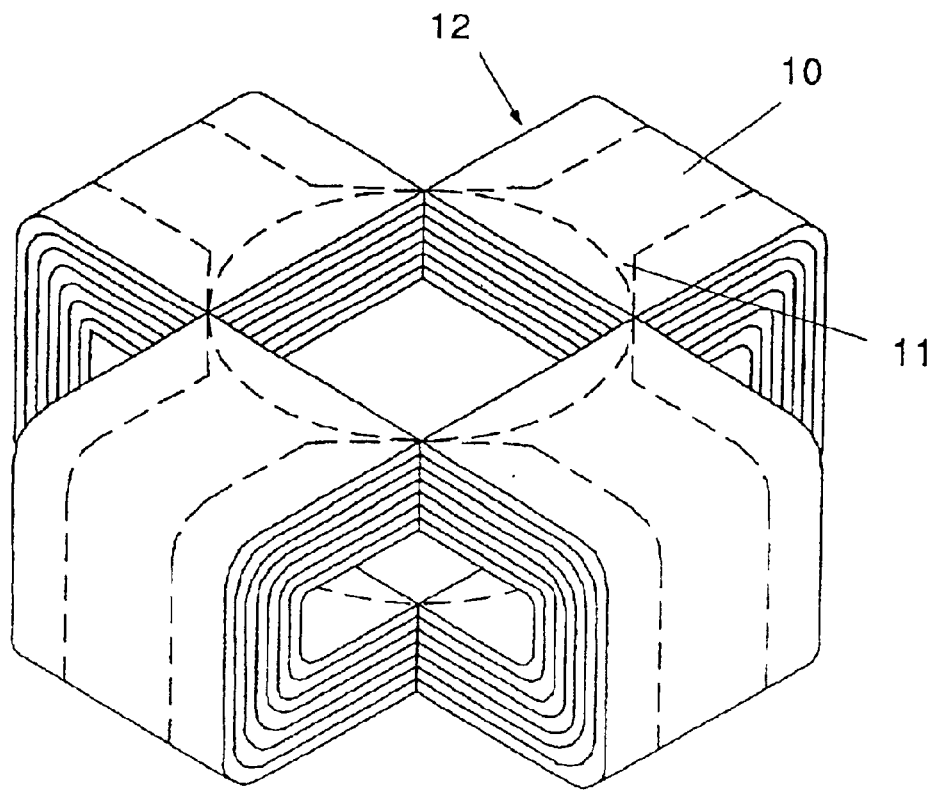
FIGS. 7A through 7C illustrate the first embodiment of the stator cores according to the present invention.
Figure 7B:
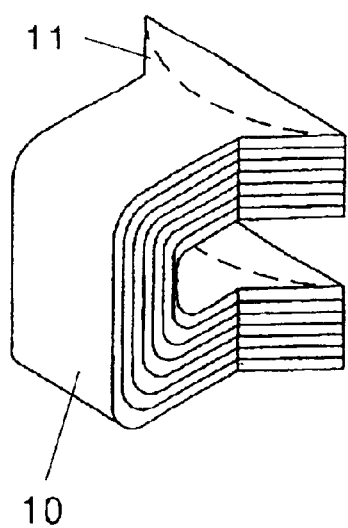
Figure 7C:
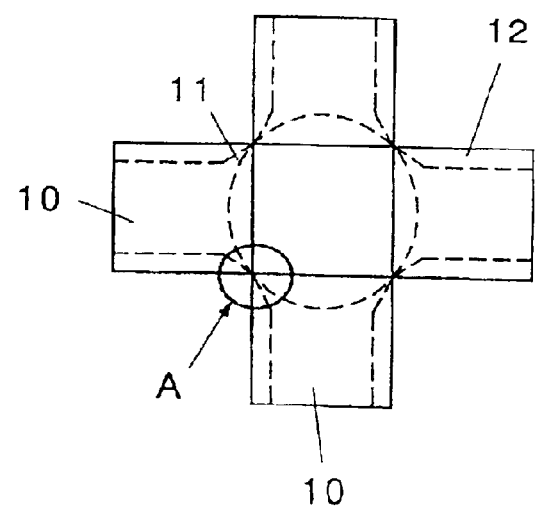

FIGS. 7A through 7C show the first embodiment of stator cores according to the present invention. In the figures, FIG. 7A is an isometric view showing the arrangement of 4 stator cores 10 for the case in which the number of magnetic poles is 4, FIG. 7B is an illustration of one of the cores after it has been machined on the outside, and FIG. 7C is a plan view of the arrangement of the 4 stator cores 10. In each view, broken lines represent the cutting surfaces on the cut cores 12.

In the first embodiment shown in FIGS. 7A through 7C, protrusions 11 extend circumferentially, and come in point contact (more accurately in 3 dimensions, line contact) with each other at point A on a plane. However, the protrusions can also be made to be in close proximity to each other with a small gap, instead of a point contact. Also, the present invention is not limited only to a case with 4 magnetic poles, in other words, 3 or 5 or more poles can be incorporated.

The aforementioned configuration can greatly reduce the production of eddy currents because there is no gap or only a very small gap between the protrusions 11, thereby heat and losses due to eddy currents generated in the rotor can be greatly reduced.

(Second Embodiment)

FIGS. 8A and 8B show the second embodiment of the stator cores according to the present invention. FIG. 8A shows one of the four stator cores 10 after it has been machined on the outside, and FIG. 8B is a plan view showing the arrangement of the four stator cores 10. In each drawing, broken lines indicate where the cut cores 12 are cut to form the stator core.

In the second embodiment shown in FIGS. 8A and 8B, the protrusions 11 are extended in the circumferential direction and come in contact with each other at the point A in the plan view. Also in this embodiment, the number of magnetic poles is not limited only to 4, but 3 or 5 poles can be incorporated.

Because there are no gaps between protrusions 11 in this configuration, the generation of eddy currents can be reduced significantly, thus heat and losses due to eddy currents produced in the rotor can be greatly reduced. In addition, since the protrusions contact each other in that planes, the core can be easily located and the inner periphery can be precisely cut and processed.

The stator cores 10 shown in FIGS. 6~8 are formed from laminated steel sheets shaped like the letter _U,_ of which the center side is open when viewed from the side of the shaft, therefore, the protrusions 11 contact each other or are located close to each other and the cut cores can be integrated into one body together with coils. Consequently, the laminated steel sheets in the protruding tips (protrusions 11) are the same steel sheets as those where the coils are located, so the layers of laminations prevent the sheets from collapsing during processing, and also detachment, crushing or peeling of the laminations can be avoided, and the cores can be efficiently cut and processed.

Because the cores can be machined after being formed from the cut cores, even an amorphous material that cannot be easily laminated can be used in practice.

(Manufacturing Method 1)

FIG. 9 shows the method of manufacturing stator cores according to the present invention. This method of the present invention consists of an outside machining step (A), a coil assembling step (B), a core assembling step (C) and an inside cutting step (D).

In the outside machining step (A), a cut core 12 manufactured by winding a continuous steel sheet 12a coated with an insulating material into a rectangular shape, that has been formed and then cut into equal parts, beforehand, is machined on the outside thereof leaving the protrusions 11.

In the coil assembling step (B), a coil is installed on the cut core 10 the outside of which has been machined. In the core assembling step (C), a plurality (4 in this example) of cut cores 10 are arranged in the prescribed positions. In the inside cutting step (D), the inside of the plurality of cut cores 10 that have been placed in position is cut, thereby the stator cores 10 are completed.

By virtue of the manufacturing method shown in FIG. 9, the inside of the plurality of cut cores 10 can be completed at one time, and the cut surfaces can be made very accurate and concentric. When the inner periphery of each toothed end is cut, the cutting tool moves in the direction of the lamination and in the plane of the layers of laminations on the inner periphery of the toothed ends, so no eccentric loading or bending takes place, the layers of steel sheets remain laminated without any irregularities due to cutting, the insulating material is prevented from being crushed or torn or otherwise peeled off, and this ensures that the inner surface is smooth and truly circular.

(Manufacturing Method 2)

FIG. 10 shows another method of manufacturing stator cores according to the present invention. The manufacturing method shown in FIG. 10 according to the present invention incorporates an inside cutting step (E), an outside machining step (F) and a coil assembling step (G).

In the inside cutting step (E), cut cores 12 that have been manufactured by winding a continuous steel sheet 12a coated with an insulating material into a rectangular shape, and the rectangle has been formed and then cut into two equal parts beforehand, a plurality (4 in this example) of cut cores 12 are assembled in the required positions and the inside thereof is cut.

In the outside machining step (F), the outside and inside surfaces of the plurality of cut cores 10 are machined, leaving protrusions 11 on the outside of the cut cores 10. In the coil assembling step (G), coils are installed on the plurality of cut cores 10 of which the outside has been machined, thus the manufacturing of the stator cores 10 is completed.

Although the manufacturing method in FIG. 10 requires the inside surface to be cut twice, the number of machining processes can be reduced. In addition, when the inner periphery of the toothed ends is cut and processed by rotating the cores, the cutting work can be carried out both in the direction of laminating and in the plane of the layers of laminations on the inner surface of toothed ends, without producing an eccentric load or bending force, so the cut edges of the steel sheets remain smooth and free from roughness, and the insulating material is prevented from being peeled off due to crushing or tearing, thereby ensuring that the inner surface is smooth and truly circular.

Next, the third through ninth embodiments of the stator cores for a magnetic bearing according to the present invention are described below.

FIG. 11 shows a plan view and sectional elevation of the third embodiment of the present invention. FIG. 12 shows elevation views of the fourth through sixth embodiments of the present invention. FIG. 13 shows isometric views of the stator cores of the third through sixth embodiments. FIG. 14 shows the plan and side elevation of the seventh embodiment. FIG. 15 shows the front view and elevation of the eighth embodiment. FIG. 16 are front view and elevation drawings of the ninth embodiment.

For the convenience of description, abbreviations are used for the stator cores; A for the third embodiment, B for the fourth, C for the fifth, D for the sixth, E for the seventh, F for the eighth and G for the ninth.

(Third Embodiment)

Figure 13A:
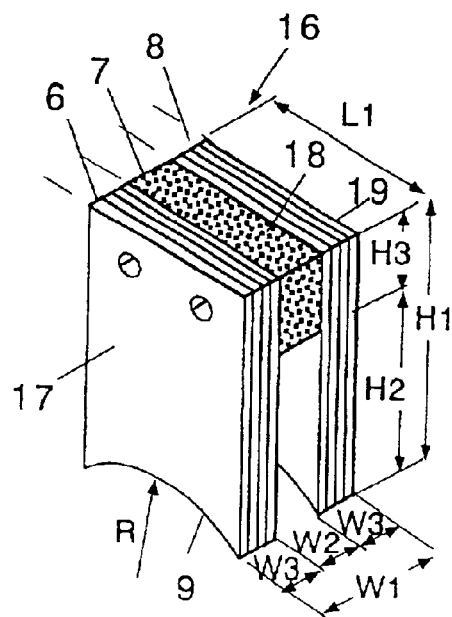
FIGS. 13a through 13d are isometric views of the third through sixth embodiments of stator cores based on the present invention.

First, the third embodiment of stator cores (type A) for a magnetic bearing according to the third embodiment of the present invention are described referring to FIGS. 11a, 11b and 13a.

The magnetic bearing of the third embodiment is a homo-polar radial magnetic bearing. The homo-polar radial magnetic bearing 1 is provided with a casing 2 and a plurality of electromagnetic components 13 and a rotor 3. The rotor 3 is a rotor constructed with magnetic material at least on the outer surface thereof, and with a predetermined outer diameter D1. The rotor 3 is positioned on the centerline of the casing 2, parallel to it in the axial direction, and supported so it is free to rotate at a high speed. The plurality of electromagnetic components 13 supports the rotor 3 in a freely rotatable manner, and is arranged around the rotor 3. For instance, four electromagnetic components are assembled into a set, and the set of electromagnetic components 13 supports the rotor 3 at 2 locations. Four electromagnetic components are spaced at equal angles around the rotor at each supporting point.

The electromagnetic components 13 are provided with a stator core 16 and coils 5. The stator core 16 is composed of two yokes 6, 8 and a stem unit 7 (FIG. 13a). The yokes 6, 8 are pole units each end of which forms a magnetic pole surface 9 opposite the outer surface of the rotor 3 (that is, the supporting surface) with a predetermined gap between them through which the magnetic flux passes. The two yokes 6 and 8 are arranged with a predetermined spacing in the lateral direction. The stem unit 7 is a rectangular block that is sandwiched between the other ends of the yokes and through which the magnetic flux passes. A stator core 16 is shaped like a letter _U_ with a considerable thickness, as the two yokes 6 and 8 and the stem unit 7 are connected into one body without gaps, and the core is installed in a recessed portion on the inner periphery of the casing 2.

The coil 5 is a bundle of wire. The wire is wrapped in several layers around yokes 6, 8, and the coil 5 is formed into a block with the same shape as the cross sections of yokes 6, 8 but with an air gap between the coil and yokes.

The structure of stator cores 16 is described in further detail. A stator core 16 is composed of a first yoke component 17, stem unit component 18 and second yoke component 19.

The first yoke component 17 is a pole body with a predetermined width. The pole body is made of so-called laminated steel sheets, that is, is composed of a plurality of magnetic steel sheets and sheets of an insulating material. The magnetic steel sheet is a thin steel sheet with a thickness of T, shaped as a quadrilateral with one end curved with a radius of curvature R. The insulating material is a non-conducting material and is applied between each of the plurality of magnetic steel sheets. Magnetic steel sheets are laminated in the lateral direction, and when a stator core is assembled as an electromagnetic component, the lamination direction thereof is aligned with the axial direction of the rotor 3. The first yoke component 17 is a pole body with a uniform width W3 in the direction of lamination of the steel sheets, and one end of thereof forms a magnetic pole surface 9 with a radius of curvature R. Holes for assembling the core are provided with their axes in the lateral direction, at locations at the opposite end from the magnetic pole surface 9 (called counter-magnetic pole surface for short).

The construction of the second yoke component 19 is the same as that of the first yoke component 17, so no additional description is given here.

The first yoke component 17 and the second yoke component 19 are opposite each other in the lateral direction with a gap W2 between them.

The stem unit component 18 is a rectangular block with a width W2, height H3 and length L1. The stem unit component 18 is arranged such that one surface in the direction of the height of the component is in the same plane as the counter-magnetic pole surfaces of the first yoke component 17 and the second yoke component 19, and the stem unit is sandwiched between the first yoke component 17 and the second yoke component 19. The stem unit component 18 as a whole is composed of a magnetic powder filled resin. Holes for assembling are provided with the axes thereof directed laterally.

The first yoke component 17, the stem unit component 18 and the second yoke component 19 are fastened together and to the casing 2 by bolts penetrating through the holes used for assembly, to form an integrated stator core 16.

(Fourth Embodiment)

Figure 13B:
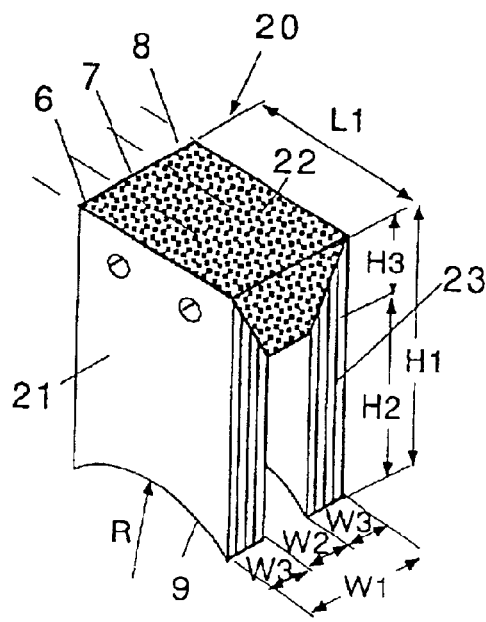

Next, a magnetic bearing and the stator core (type B) according to the fourth embodiment are described referring to FIGS. 12a and 13b. The construction of the magnetic bearing is the same as that of the third embodiment, so the description is not duplicated, but the construction of the stator core (type B) is described in detail.

The stator core 20 consists of a first yoke component 21, a stem unit component 22 and a second yoke component 23.

The first yoke component 21 is a pole body with a predetermined width. The polar body is made of so-called laminated steel sheets, that is, is composed of a plurality of magnetic steel sheets and sheets of an insulating material. The magnetic steel sheet is a thin steel sheet with a thickness T, shaped as a quadrilateral with one end curved with a radius of curvature R. The insulating material is a non-conducting material and is applied between each of the plurality of magnetic steel sheets. Magnetic steel sheets are laminated in the lateral direction, and when a stator core is assembled as an electromagnetic component, the lamination direction thereof is aligned with the axial direction of the rotor. The first yoke component 21 is a pole body with a uniform width of in the direction of lamination of the steel sheets, and one end of thereof forms a magnetic pole surface 9 with a radius of curvature R. The surface at the opposite end from the magnetic pole surface 9 (called the counter-magnetic pole surface for short) is cut at an angle so as to intersect the surface of steel sheets at an angle less than 90°. Holes for assembling are provided at locations near the counter-magnetic pole surface, with their axes directed laterally.

The first yoke component 21 and the second yoke component 23 face each other in the lateral direction with a gap W2 between them such that their counter-magnetic pole surfaces face each other.

The stem unit component 22 is a rectangular wedge in shape. The inclined surfaces of the stem unit component 22 contact the counter-magnetic pole surfaces of the first and second yoke components 21 and 23, and the stem unit component is sandwiched by the first and second yoke components 21, 23. The stem unit component 22 is a solid made entirely of a magnetic material powder solidified in resin. Holes for assembling are provided with the axes thereof directed in the lateral direction.

The first yoke component 21, the stem unit component 22 and the second yoke component 23 are fastened together and to the casing 22 by bolts penetrating through the holes used for assembly, to form an integrated stator core 20.

(Fifth Embodiment)

Figure 13C:
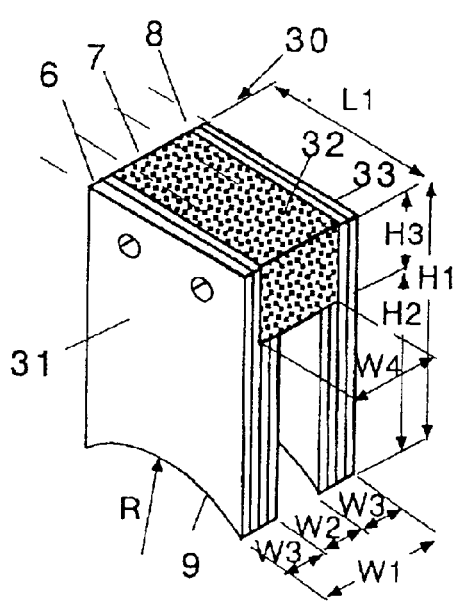

Next, a magnetic bearing and the stator core (type C) therefor according to the fifth embodiment is described referring to FIGS. 12b and 13c. The construction of the magnetic bearing is the same as that of the third embodiment, so a duplicate description is omitted here, and the construction of the stator core (type C) 30 is detailed below.

The stator core 30 is provided with a first yoke component 31, a stem unit component 32 and a second yoke component 33.

The first yoke component 31 is a pole body with a predetermined width. The pole body is made of so-called laminated steel sheets consisting of a plurality of magnetic steel sheets and sheets of an insulating material. The magnetic steel sheet has a thin quadrilateral shape with a thickness T and one end is curved with a radius of curvature R. The insulating material is a non-conducting material and is applied between each of the plurality of magnetic steel sheets. Magnetic steel sheets are laminated in the lateral direction, and when stator cores are assembled as electromagnetic components, the lamination direction thereof is aligned with the axial direction of the rotor. The first yoke component 31 is a pole body having a uniform width W3 in the direction of lamination of the steel sheets, and one end thereof forms a magnetic pole surface 9 with a radius of curvature R. The surface at the opposite end from the magnetic pole surface 9 (called the counter-magnetic pole surface for short) is stepped in the direction of the thickness. Holes for assembling are bored at locations near the counter-magnetic pole surface, with the axes thereof directed in the lateral direction.

The construction of the second yoke components 33 is same as that of the first yoke component, so no additional description is give below.

The first yoke component 31 and the second yoke component 33 face each other in the lateral direction with a gap W2 between them so that the locations with the stepped surfaces face each other.

The stem unit component 32 is a solid rectangle in shape with a width W4, height H3 and length L1. The stem unit component 32 engages with the stepped portion of the first yoke component 31 and the stepped portion of the second yoke component 32, and is sandwiched by the first and second yoke components 31, 33. The step unit component 18 is made entirely from a magnetic material powder, solidified in resin. Holes for assembling are provided with the axes thereof directed laterally.

The first yoke component 31, the stem unit component 32 and the second yoke component 33 are fastened together and to the casing 2 by bolts inserted through the holes for assembly, thus making an integrated stator core 30.

(Sixth Embodiment)

Figure 13D:
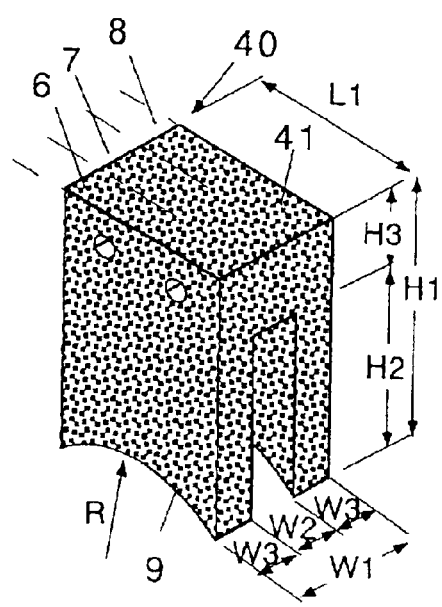

Next, referring to FIGS. 12c and 13d, a magnetic bearing and the stator core (type D) thereof according to the sixth embodiment is described. The construction of the magnetic bearing is not described because it is the same as that of the third embodiment, instead the construction of the stator core (type D) 40 is described in detail.

The stator core 40 is shaped like an inverted letter _U,_ and is made entirely of a solid made from a magnetic material powder solidified in resin. Holes for assembling are open with the axes directed laterally.

The outer shape of the stator core 40 is identical to the stator cores of the aforementioned third through fifth embodiments.

(Seventh Embodiment)

Next, a magnetic bearing and the stator core (type E) thereof according to the seventh embodiment are described. The construction of the magnetic bearing is the same as that of the third embodiment, so a description is not given here, and the construction of the stator core (type E) 50 is described below.

Although the combination of stator cores 50 is described based on the above-mentioned A type shown in FIGS. 14a and 14b, this is not restrictive, and any of types A through D can be employed.

The widths of the peripheral portions near the magnetic pole surfaces 9 of yokes 6 and 8 are extended along the outer surface of the rotor, and the portions in contact or in close proximity to those of adjacent magnetic pole surfaces of the stator core, that is, electromagnetic components.

(Eighth Embodiment)

Next, a magnetic bearing and its stator core (type F) according to the eighth embodiment are described referring to FIGS. 15a and 15b. Since the construction of the magnetic bearing is the same as that of the third embodiment, no description is given below, and only the construction of the stator core (type F) 60 is described.

Although the figures illustrate the aforementioned A type in the combination of stator cores 60, the design is not restricted only to type A, but any of A through D types can be used in practice.

The widths near the magnetic pole surfaces 9 of yokes 6, 8 are extended circumferentially along the rotor supporting surface, and are integrated with or in close proximity with the magnetic pole surfaces of adjacent electromagnetic components, that is, stator cores 60.

(Ninth Embodiment)

Next, referring to FIGS. 16a and 16b, a magnetic bearing and its stator core (type G) according to the ninth embodiment are described. The magnetic bearing of the ninth embodiment is a hetero-polar radial magnetic bearing.

The stator core 70 is entirely made from a magnetic material powder, solidified in resin.

Next, the operation of the third through ninth embodiments is described. In the following descriptions, the magnetic bearing is energized by direct current.

Figure 17:
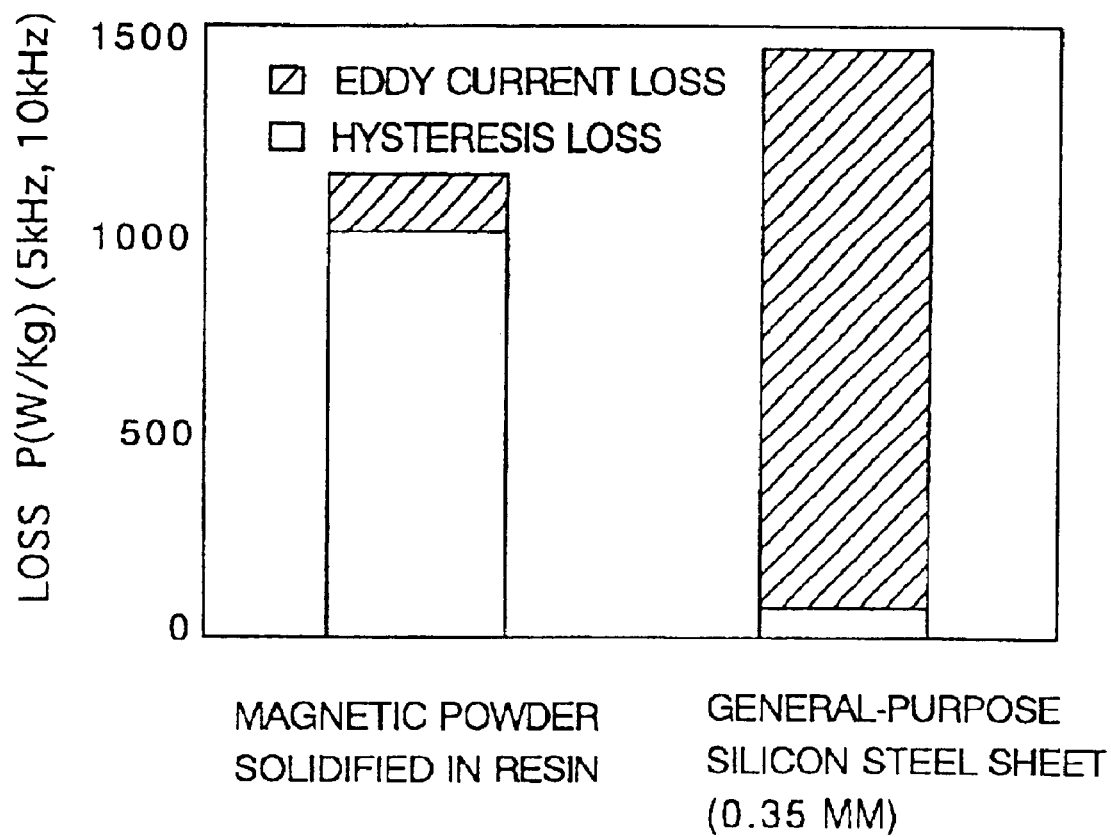
FIG. 17 is a diagram showing the magnetic characteristics of a magnetic material powder, solidified in resin, and general-purpose silicon steel sheets.

FIG. 17 shows a diagram comparing the magnetic characteristics of a solid made from a magnetic material powder solidified in resin with the magnetic characteristics of a general-purpose silicon steel sheet (0.35 mm thick) normally used as the material for laminated steel sheets. Obviously, the magnetic material powder solidified in resin has a larger hysteresis loss and a smaller eddy current loss than the general-purpose silicon steel sheet.

When the magnetic bearing of the third through ninth embodiments is energized with direct current, magnetic flux passes between the stator core and the rotor. For instance, the magnetic flux flows in a closed path from the counter-magnetic pole surface to the magnetic pole surface of the first yoke 6, through the surface of the rotor, through the second yoke 8 from the magnetic pole surface to the counter-magnetic pole surface, through the stem unit 7, back to the first yoke. The magnetic flux path is curved in 3 dimensions and the flux flows through a place on the second yoke 8 to the stem unit 7, and through another place on the stem unit 7 to the first yoke, however because the stem unit is composed of a material in which an extremely small amount of eddy currents are produced, eddy current losses can be minimized.

On the other hand, the magnetic bearing is driven by direct current that contains very few AC components, so the hysteresis losses produced in the stator core are negligibly small.

Therefore, using any of the stator cores according to the third through ninth embodiments, a magnetic bearing with small eddy current losses can be manufactured.

When using a stator core of any of the third through eighth embodiments, since the peripheral widths near the magnetic pole surfaces 9 of yokes 6, 8 are extended along the outer surface of the rotor, periodic variations in the intensity of the magnetic field produced on the surface of the rotor can be minimized when the rotor rotates, so eddy current losses created on the rotor surface can be reduced.

When one of types A through C is introduced into the stator cores for the seventh and eighth embodiments, since the magnetic pole surfaces are curved surfaces in the magnetic steel sheets of the yokes, even when the curved surface is machined by a lathe, the surfaces of the magnetic steel sheets can satisfactorily resist machining forces, so the laminated steel sheets are no longer peeled off so that a highly accurate curved surface can be manufactured.

When one of the stator cores for a magnetic bearing according to the above-mentioned embodiments is used, the magnetic bearing has few eddy current losses.

When any of the stator cores for a magnetic bearing according to the third through fifth (types A, B and C) embodiments is used, the features of laminated steel sheets and advantageous characteristics of a body made of magnetic material powder solidified in resin are effectively combined, and a magnetic bearing with small eddy current and hysteresis losses can be developed.

Using stator cores for a magnetic bearing according to the sixth (type D) or ninth (type G) embodiments, electromagnetic components can be precisely fabricated with no laminations concerning the shape, so various requests for designing a magnetic bearing can be flexibly satisfied.

Using stator cores for a magnetic bearing according to the third through eighth (types A, B, C, D, E and F) embodiments, eddy current losses on the surface of a rotor can be reduced.

In the aforementioned embodiments, a radial bearing was taken as an example, however, applicable bearings in practice are not limited only to this example, and the present invention can also be applied to a thrust bearing. In addition, although the descriptions were given assuming a structure for supporting a rotating rotor, the invention is not limited only to this example, but for instance, the present invention can also be applied to a guide for a linear motion drive. In addition, the foregoing descriptions referred to examples wherein a stator core was composed of one component or three components, but the scope of the present invention is not restricted only to these compositions, and two components or four or more components can be used for the composition. A biasing magnet may also be included as part of a stator core.

The above-mentioned stator cores for a magnetic bearing and the method of manufacturing them offer the following advantages.

1. Since the laminated steel sheets of a cut core are bonded satisfactorily, protrusions of a magnetic pole can also be fabricated in a laminated structure.
2. Protrusions are joined together magnetically but are isolated electrically, so losses can be reduced without degrading the characteristics of the bearing. That is, using cut cores, the protrusions of magnetic poles can also be made of laminated steel sheets, resulting in a reduction of iron losses.
3. A wider selection of types of electromagnetic steel sheets becomes possible, and amorphous materials that are difficult to laminate can also be used for the magnetic poles.

Therefore, the stator core for a magnetic bearing and the method of manufacturing it according to the present invention can be composed of laminated steel sheets even if the stator cores are provided with protrusions extending in the circumferential direction; in addition, laminated steel sheets can be prevented from becoming detached, crushed or peeled, so they can be efficiently cut and machined; furthermore, an amorphous material that is difficult to laminate can be used as a raw material; consequently, the cost of manufacturing and machining the stator cores can be reduced, while the eddy currents generated in the stator unit can also be greatly reduced, which are excellent advantages in practice.

According to the present invention, stator cores for a homo-polar magnetic bearing that supports a rotating body provide the following effects due to the configuration thereof.

Since the first yoke, stem unit and second yoke are integrated into a U shape and the stem unit is made of a magnetic material powder solidified in resin, when magnetic flux is passed through them, the flux passes in a closed path through the first yoke, the moving body, the second yoke and the stem unit, whereby magnetic pole surfaces at one end of each of the first and second yokes support the rotor at the supporting surfaces; because the magnetic material powder solidified in resin does not generate eddy currents, the stem unit produces little eddy current loss, so a magnetic bearing with low losses can be offered.

Moreover, since the first pole body and the second pole body are laminated bodies that are composed of magnetic steel sheets interleaved with a non-conducting substance and laminated in a direction orthogonal to a line normal to the aforementioned magnetic pole surfaces, when magnetic flux passes through the yokes, eddy current losses are suppressed and a magnetic bearing with still lower losses can be developed.

In addition, as the first pole body and the second pole body are laminated bodies made of magnetic steel sheets interleaved with a non-conducting material and laminated in the lateral direction, eddy current losses produced when magnetic flux is passed through the yokes are suppressed, so a magnetic bearing with even lower losses can be realized.

In addition, according to the present invention as described above, stator cores for a magnetic bearing used to support a rotor with a magnetic supporting surface are provided with a N-pole magnetic pole surface and S-pole magnetic pole surface facing the supporting surface, therefore when magnetic flux is passed through the stator cores of the magnetic bearing, N-pole and S-pole magnetic pole surfaces support the supporting surface of the rotor; because the magnetic material powder solidified in resin produces low eddy current losses, the losses are suppressed, so a magnetic bearing with low losses can be presented.

Also, when stator cores for a magnetic bearing according to the present invention support a rotating body, eddy current losses are suppressed and a low loss magnetic bearing for a rotor can be achieved.

As a consequence, the present invention provides stator cores for a magnetic bearing constructed in such a way that the utilization of materials is high, the work pieces can be machined with a high accuracy, and eddy currents are reduced to a minimum.

Although the present invention has been described referring to a number of preferred embodiments, it should be understood that the scope of rights included in the present invention is not restricted only to these embodiments. Conversely, the scope of rights of the present invention should include all improvements, modifications and equivalent entities that belong to the scope of the attached claims.

What is claimed is:

1. In the stator cores for a homo-polar magnetic bearing, wherein the toothed ends of the stator cores surrounding a rotor form N poles and S poles adjacent to each other in the axial direction, stator cores for the magnetic bearing comprising U-shaped laminated steel sheets that include protrusions which are projections of adjacent N poles and S poles extended in the circumferential direction so as to be in contact with or in close proximity to each other, are laminated and interleaved with an insulating material, and are shaped into a letter "U" of which the center side is open when viewed from the centerline side, and wherein the protrusions are flattened at the points where they are in contact or in close contact with each other.

2. The stator cores for the magnetic bearing specified in claim 1, wherein the U-shaped laminated steel sheets are cut cores that are fabricated by:

(a) winding a continuous steel sheet coated with an insulating material into a rectangular shape; and (b) forming and cutting the rectangle into two equal portions.

3. The stator cores for the magnetic bearing specified in claim 1, arranged in a group of four stator cores with their open center portions oriented towards each other.

4. The stator cores for a homo-polar magnetic bearing, wherein the toothed ends of the stator cores surrounding a rotor form N poles and S poles adjacent to each other in the axial direction, comprising:

U-shaped laminated steel sheets that include protrusions which are projections of adjacent N poles and S poles extended in the circumferential direction so as to be in contact with or in close proximity to each other, are laminated and interleaved with an insulating material, and are shaped into a letter "U" of which the center side is open when viewed from the centerline side, and wherein the protrusions are flattened at the points where they are in contact or in close contact with each other.

* * * * *